(No Model.) 2 Sheets—Sheet 1.
P. SCHNEIDER & H. TRENKAMP.
VAPOR BURNER.
No. 417,343. Patented Dec. 17, 1889.
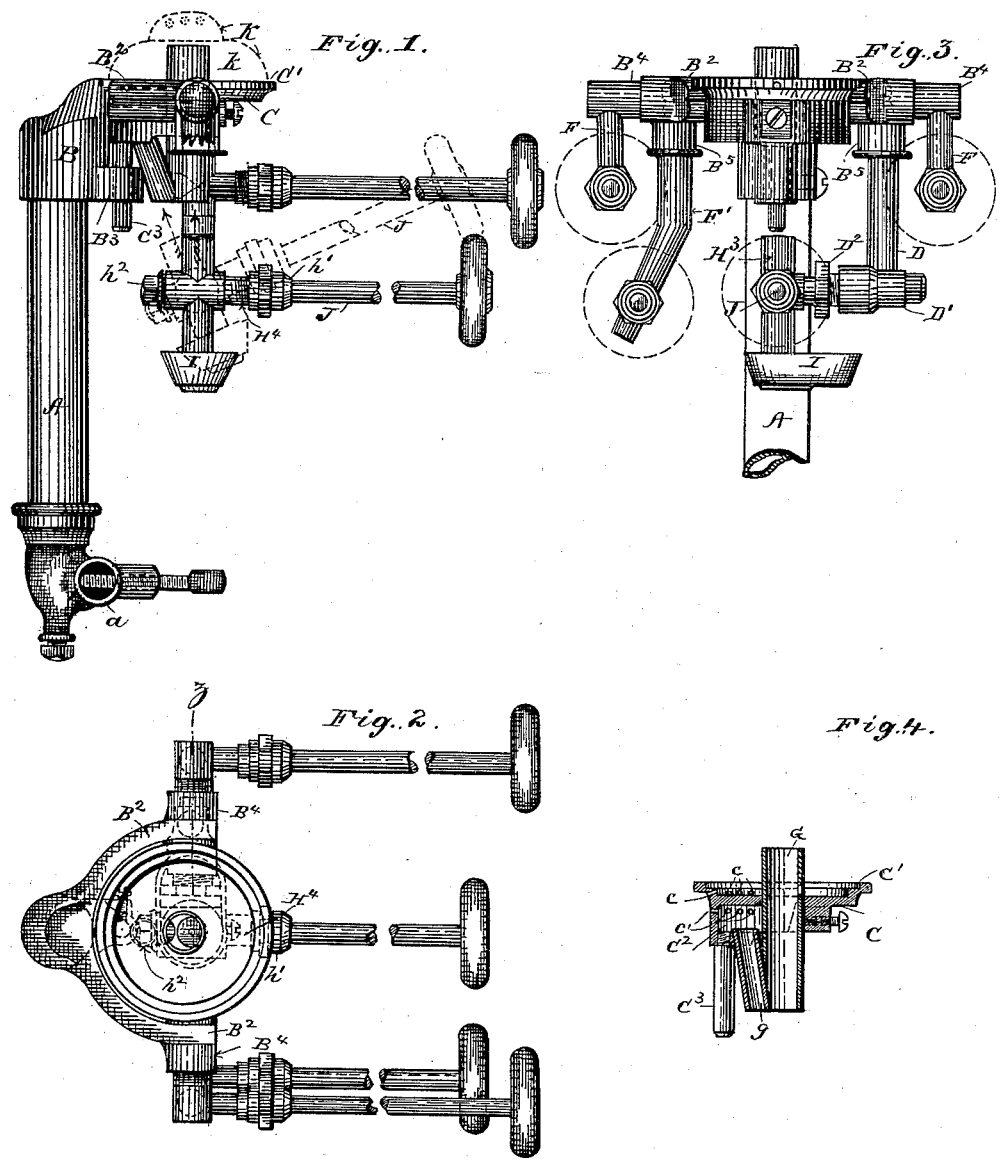
Witnesses.
W. R. Edelin
B. S. Lourie
Inventors
Paul Schneider
Henry Trenkamp
By Leggett & Leggett
Att'ys (No Model.) 2 Sheets—Sheet 2.
P. SCHNEIDER & H. TRENKAMP.
VAPOR BURNER.
No. 417,343. Patented Dec. 17, 1889.
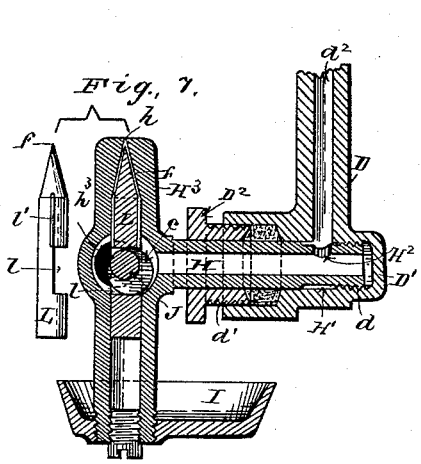
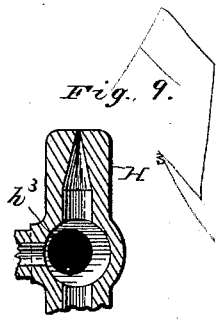
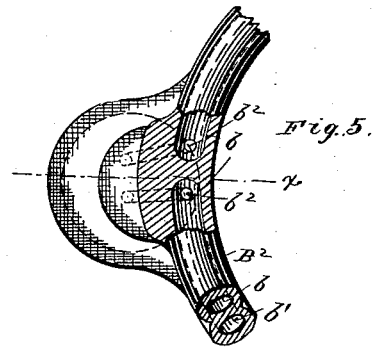
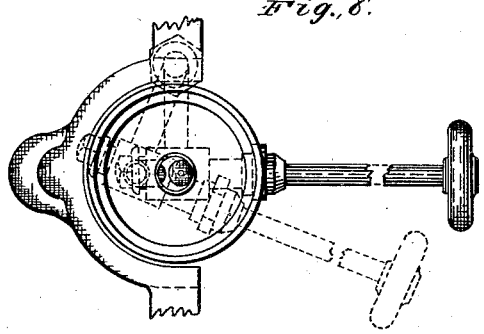
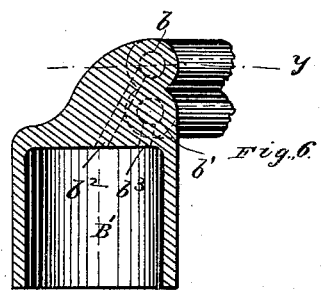
Witnesses:
W. R. Edelen.
C. S. Lourie.
Inventors.
Paul Schneider
Henry Trenkamp
By Leggett & Leggett
Att'ys

UNITED STATES PATENT OFFICE.

PAUL SCHNEIDER AND HENRY TRENKAMP, OF CLEVELAND, OHIO.

VAPOR-BURNER.

SPECIFICATION forming part of Letters Patent No. 417,343, dated December 17, 1889.

Application filed June 27, 1889. Serial No. 315,708. (No model.)

*To all whom it may concern:*

Be it known that we, PAUL SCHNEIDER and HENRY TRENKAMP, of Cleveland, in the county of Cuyahoga and State of Ohio, have invented certain new and useful Improvements in Vapor-Burners; and we do hereby declare the following to be a full, clear, and exact description of the invention, such as will enable others skilled in the art to which it pertains to make and use the same.

Our invention relates to improvements in vapor-burners; and it consists in certain features of construction and in combination of parts hereinafter described, and pointed out in the claims.

In the accompanying drawings, Figure 1 is a side elevation, partly in section. Fig. 2 is a plan view, the burner-cap being removed. Fig. 3 is a front elevation. Fig. 4 is a side elevation in section through the center of the burner-head. Fig. 5 is a plan in section on line $y$ $y$, Fig. 6; and Fig. 6 is a side elevation in section on line $x$ $x$, Fig. 5, these two figures being enlarged. Fig. 7 is an enlarged elevation in section in detail on line $z$, Fig. 2. Fig. 8 is a plan in detail, showing a modification hereinafter described. Fig. 9 shows a reverse section of a portion shown in Fig. 7.

A represents the stand-pipe, connected below in the usual manner with supply-pipe $a$. The upper end of the stand-pipe connects with generator-head B, the latter having a chamber B′, and having integral arms $B^2$, branching off in opposite directions. Head B has also a forwardly-projecting lug $B^3$, pierced vertically for receiving steady-pin $C^3$, hereinafter mentioned.

The generator is constructed usually of brass, and when cast arms $B^2$ are straight and holes $b$ $b'$ are drilled from the ends of the arms, the one hole above the other, as shown, the holes extending to near the lateral center of these arms, where holes $b^2$ $b^3$ are drilled, connecting holes $b$ $b'$ with chamber B′. Holes $b$ $b'$ are plugged at the outer ends, and arms $B^2$ are bent to the approximately semicircular form shown to embrace loosely burner-head C. Arms $B^2$ at the end thereof have horizontal nozzles $B^4$, connecting with holes $b$, and depending nozzles $B^5$, connecting with holes $b'$. Nozzles $B^4$ connect with hollow arms F, and the one nozzle $B^5$ connects with hollow arm F′ and the other nozzle $B^5$ connects with hollow arm D. The different hollow arms and inclosed conducts are designed to supply four burners, hence the four holes in arms $B^2$, one for each burner, arm D supplying vapor to the central burner.

Arms F F′ are provided in the usual manner with jet-orifices closed by needle-valves $f$, by means of which vapor is supplied to large commingling-tubes (not shown) leading to the different "outside" burners, so called in contradistinction to the central burner, the outside burners and commingling-tubes leading thereto being arranged in various ways, according to the construction of the stoves. This matter of arranging commingling-tubes to lead to different burners supplied from a single generator is well understood, and as our present invention relates solely to the generator and central burner and connected mechanism it is not considered necessary to show or further describe any arrangement of outside burners and commingling-tubes leading thereto.

Member C, known as "burner-head," consists of a horizontal disk having an upturned rim C′ slightly overhanging the disk, the rim constituting a seat for the central burner-cone K. Rim C′, just under the lateral projection thereof, is pierced with a series of small holes $c$ for discharging jets of flame against arms $B^2$ of the generator during the time that the central burner is in operation. The rearward portion of disk C is of considerable thickness, and is cored to form chamber $C^2$, with a series of small holes $c'$ leading from this chamber through the walls thereof for directing jets of flame against arms $B^2$ when the central burner is not in operation. Chambers $k$, inclosed between the disk and cone K above, may be considered the primary commingling-chamber, chamber $C^2$ constituting a secondary commingling-chamber. The burner-head is mounted for support on pin $C^3$ aforesaid, and hence the burner-head may be removed by lifting it, so as to draw pin $C^3$ from its engagement with lug $B^3$ aforesaid.

G is an upright primary commingling-tube extending through a central hole in disk C and discharging into chamber $k$. A small secondary commingling-tube $g$ discharges into chamber $C^2$, the lower ends of the two commingling-tubes being arranged side by side, and are supplied alternately from a single jet-orifice constructed in a vibrating arm arranged as follows: Arm D aforesaid has a lateral head D' bored from the one end thereof, and having internal-screw-threaded sections at $d$ $d'$, the former for receiving the screw-threaded section of arm H and the latter for receiving stuffing-box gland $D^2$. Arm H has a screw-threaded section at the extreme thereof for engaging screw-threads $d$ aforesaid, and arm H has a reduced section H' located opposite hole $d^2$ of arm D, this reduced section having a lateral hole $H^2$, connecting with the central bore of arm H, this lateral hole registering approximately with hole $d^2$. Integral with arm H is an upright arm $H^3$, having at the upper end a jet-orifice $h$ and having attached at the lower end lighting-cup I. Arm $H^4$, integral with the last two mentioned arms, projects forward, and in the central bore thereof operates valve-rod J, this rod at the inner end thereof having an eccentric $j$ for operating valve L, the latter having a recess $l$ for receiving the eccentric. By turning rod J in the one direction or the other valve L is moved endwise in opening or closing the jet-orifice $h$. Cap $h'$ and plug $h^2$ are removable, thereby giving access internally for assembling the parts. A recess $h^3$ (see Fig. 9) admits the eccentric forward and out of the way of the valve in assembling the parts; but the parts having been assembled the eccentric in operating the valve is not turned in position to again enter this recess. With the parts in the position shown in solid lines, Fig. 1, jet-orifice $h$ discharges into commingling-tube G for operating the central burner, whereby the generator is heated to such a degree as to furnish gas for the other burners. When the burners are not wanted, rod J is tilted upward, thereby bringing the parts to the position shown in dotted lines, Fig. 1, whereby jet-orifice $h$ discharges into commingling-tube $g$. When this is done, valve L should be nearly closed, so as to discharge only a limited amount of vapor—just enough to keep the generator hot and ready for use. In tilting this part of the device to discharge the gas into the one or the other of the commingling-tubes the threaded section of arm H turns in the engaging screw-threads $d$, these screw-threaded sections having an easy fit; but the packing at the stuffing-box is kept sufficiently tight to hold the parts in the desired position without fastening.

Stops of some kind should be connected with the stove in position to limit the upward and downward movement of rod J as a mere matter of convenience.

In Fig. 8 the parts are slightly modified—in this, that arm H has a vertical axis, so that this arm is swung forward and backward in directing the gas-jet into the one commingling-tube or the other.

We will add that valve L should have one or more slight longitudinal grooves $l'$ along the body thereof to allow a free passage of the vapor past the valve.

It will be understood that the screw-threaded section of arm H holds the arm endwise, and consequently no shoulder or other device is required for such purpose.

What we claim is—

1. In a vapor-burner, in combination, central burner head and cone having primary and secondary commingling-chambers, substantially as indicated, primary and secondary commingling-tubes leading to the respective chambers, a vibrating arm having jet-orifice adapted to discharge into the one commingling-tube or the other, according to the position of the arm, substantially as set forth.

2. The combination, with a hollow arm having a jet-orifice in the end thereof and a valve-rod having an eccentric thereon, of a needle-valve having a recess in its body for the reception of the eccentric and grooves in the sides thereof above the recess for the passage of vapor upward past the valve, substantially as set forth.

3. The combination, with central burner-head having primary and secondary commingling chambers and tubes with lateral jet-orifices leading from the respective chambers, of generator having hollow arms embracing loosely such burner-head, such curved arms being in position to be impinged by jets of flame from either series of jet-orifices of the burner-head, substantially as set forth.

In testimony whereof we sign this specification, in the presence of two witnesses, this 3d day of May, 1889.

PAUL SCHNEIDER.
HENRY TRENKAMP.

Witnesses:
CHAS. H. DORER,
ALBERT E. LYNCH.